3,692,546
METHOD OF DRYING FRUITS
Amior Dolev, Chaim H. Mannheim, and Moshe Schimmel, Haifa, Israel, assignors to Centre for Industrial Research, The National Council for Research and Development, Haifa, Israel
No Drawing. Filed Mar. 13, 1970, Ser. No. 19,480
Claims priority, application Israel, Mar. 21, 1969, 31,873
Int. Cl. A23b 7/00
U.S. Cl. 99—204                    14 Claims

ABSTRACT OF THE DISCLOSURE

A method for the manufacture of dehydrated fruits, which comprises in combination the steps of fissuring the skin of the fruit by immersion in a dilute aqueous alkaline liquid, neutralizing the fruit with an edible acid, impregnating the fruit in vacuo with an aqueous sulfuring solution in an amount sufficient to preserve the fruit and forced-draft drying the fruit. The method is particularly applicable to fruit of the genus Prunus, but also to others such as grapes and pears.

---

This invention relates to the preservation, by dehydration, of fruit such as, for example, apricots, plums, peaches, nectarines, grapes, pears or the like.

The conventional dehydration of various kinds of fruit, e.g. of the genus Prunus, comprises two main operations: sulfuring the fresh fruit and drying the sulfured fruit. The sulfuring has the purpose, inter alia, of destroying microorganisms apt to cause fermentation or similar deterioration of the fruit, and in order that this aim can be achieved the sulfuring agent should deeply penetrate into the fruit and should be retained there as much as possible during the subsequent drying operation. The sulfuring agent used almost exclusively up to now is gaseous sulfur dioxide produced in situ by the combustion of sulfur. Attempts have also been made to soak the fruit in aqueous $SO_2$ solutions but it has been found that the penetration is too slow for practical purposes and gives rise to the loss of valuable flavour constituents. Even the sulfuring operation by means of gaseous $SO_2$ takes many hours, depending on the drying method used, since the fruit must retain a sufficient amount of sulfuring agent even after the dehydration: if the sulfured fruit is dried in the open air at temperatures below about 33° C., the fresh fruit should be exposed to the $SO_2$ gas for about 8 to 9 hours. If force-draft drying is used, especially at somewhat elevated temperature, the sulfuring still requires about 5 to 6 hours. The long duration of the sulfuring operation is a waste not only of time but also of working area. In the case of apricots, the drawbacks of conventional drying methods have prevented the development of the mainly small-scale, rural by-production of dried fruit, with its inherent lack of uniformity of quality of the product, into a large-scale industrial operation yielding products of standardized quality.

The invention has the object to provide a dehydration method which avoids the disadvantages of the conventional method and can conveniently be carried out on a large scale.

The invention, therefore, consists in a method for the manufacture of dehydrated fruit, which comprises in combination the steps of: (a) fissuring the skin by treating the fruit with a dilute alkaline aqueous liquid, preferably at elevated temperatures; (b) neutralizing the fruit with a dilute aqueous edible acid; (c) impregnating the fruit in vacuo with an aqueous sulfuring solution; (d) forced-draft-drying the fruit.

If the fruit is to be halved, and possibly to be pitted, this operation may conveniently follow the step (b) though it can be done at any other stage prior to the drying step, even before the step (a).

The step (a) is preferably effected by means of an alkali metal hydroxide solution, but other alkaline substances may be used, e.g. alkali metal carbonates or ammonia. With sodium hydroxide, for example, preferred concentrations of the solution are of the order of 1 to 5% by weight, and the temperature may be as high as 90° C. Thus, with a 2% solution at 90° C., the treatment achieves its purpose within as short a time as 30 to 60 seconds. The operation may be effected in batches in suitable vats, or continuously.

As an optional operation preferably interposed between steps (a) and (b) the fruit may be rinsed with water, e.g. a stream of water, for removing a large part of the alkaline matter before neutralizing the remainder thereof.

The acid used in step (b) may be, for example, citric, tartaric, acetic or phosphoric acid, and indeed any edible acid the salt of which does not unfavourably affect the flavour and taste of the fruit. The term "neutralizing" does not necessarily mean that the pH of the fruit has to be adjusted precisely to 7.0. Under-neutralizion will mainly be corrected by the subsequent sulfuring step, while over-neutralization will as a rule do no harm, provided, of course, that the fruit does not become too sour. The concentration of the acid used is not critical but it should not be so high as to cause damage to the fruit. It should be so chosen that the volume of aqueous acid to be handled is as small as possible but, on the other hand, sufficient in order to reach all the alkali remaining in the fruit. The most suitable concentration may be ascertained by simple tests in any particular case.

Step (c) is an essential feature in the method of this invention. The fact that the impregnation of the fruit is effected under sub-atmospheric pressure and by means of a liquid sulfuring agent, makes for the removal of air from the fruit and the deep penetration of the sulfuring agent into the fruit and its satisfactory retention therein during the subsequent dehydration. The magnitude of the pressure, i.e. the degree of evacuation, can be chosen within wide limits. It will determine to some extent the duration of the impregnating operation; within limits the time may be the shorter, the lower the pressure. With pressures of the order of 50 to 70 mm. Hg the impregnating time may be reduced to a few minutes. Of course, there are also other determining factors, e.g. a satisfactory fissuring of the skin in step (a), and the concentration of the sulfuring solution which is an aqueous solution of $SO_2$ or of a water-soluble bisulfite or meta-bisulfite. For example, at a pressure of 35 to 85 mm. Hg, the impregnation with a 2% by weight sodium bisulfite solution takes about 10 minutes, and with a 4% solution about 5 minutes.

The forced-draft drying operation may be carried out in any suitable manner and by means of any suitable conventional equipment. The use of a tunnel oven is mostly preferred since it enables continuous operation. Suitable temperatures and drying periods will be selected empirically in accordance with the nature of the fruit to be dried, the relative humidity of the outer air and other variable factors.

Apricots dehydrated by the method according to the invention have a pleasant orange-to-deep orange colour and an attractive glossy appearance, and a sufficiently high $SO_2$ content for keeping for a more than adequate period of time. If the process is carried out in the same manner but the forced-draft drying is replaced by open-air sun-drying, the fruit turns brown and is not glossy.

The invention is illustrated by the following examples to which it is not limited:

EXAMPLE 1

2 kg. of fresh apricots (of the Israel-grown Raanana variety) were dipped in a 2%-by-weight aqueous solution of NaOH at 90° C. for 30 seconds, rinsed with fresh water and a 3% solution of citric acid, pitted, halved, and immersed in a 4%-by-weight aqueous solution of sodium bisulfite in a vacuum vessel for 10 minutes at a pressure of 60 mm. Hg. The fruit was dried in a forced-air tunnel oven for 12 hours at 70° C. whereafter it contained 4960 p.p.m. of $SO_2$ and 10% of water.

EXAMPLE 2

The same kind of fruit as in Example 1 was treated in the same manner as described in Example 1 except that the concentration of the sodium bisulfite solution used was 2%. The fruit, dehydrated to a moisture content of 10%, contained 1600 p.p.m. of $SO_2$.

EXAMPLE 3

The method was performed as described in Example 1 but the immersion in the sodium bisulfite solution was shortened to 5 minutes and the drying extended to 13 hours. The fruit, dehydrated to a moisture content of 10%, contained 1600 p.p.m. of $SO_2$.

EXAMPLE 4

The method was performed as in Example 3, but the sodium bisulfite solution had a concentration of 2% only. The fruit, dehydrated to a moisture content of 10%, contained 768 p.p.m. of $SO_2$.

EXAMPLE 5

2 kg. of fresh peaches (of the Red Haven variety) were dipped into a 2%-by-weight aqueous solution of NaOH at 90° C. for 30 seconds, rinsed with fresh water and a 3% solution of citric acid, pitted, halved, and immersed in a 4%-by-weight aqueous solution of sodium bisulfite in a vacuum vessel for 5 minutes at a pressure of 60 mm./Hg. The fruit was dried in a forced-air tunnel oven for 12 hours at 70° C., whereafter it had a moisture content of 12% and contained 4540 p.p.m. of $SO_2$.

EXAMPLE 6

The method was performed as described in Example 5 except that the concentration of the sodium bisulfite solution was 2%. The dehydrated fruit had a moisture content of 11% and contained 2150 p.p.m. of $SO_2$.

EXAMPLE 7

For the sake of comparison the treatment was performed as described in Example 6 but as a prior art method in which the operations of dipping in NaOH and rinsing with citric acid were omitted. In this case a drying period of 20 hours was required. The dehydrated fruit had a moisture content of 11% and contained 1740 p.p.m. of $SO_2$.

EXAMPLE 8

The methods described in Examples 5, 6 and 7 were repeated with peaches of the Early East variety. The results were the same as with the Red Haven variety.

EXAMPLE 9

2 kg. of fresh grapes (of the Parlet variety) were dipped into a 0.15%-by-weight aqueous solution of NaOH at 90° C. for 30 seconds, rinsed with fresh water and a 0.3% solution of citric acid, and immersed in a 4%-by-weight aqueous solution of sodium bisulfite in a vacuum vessel for 5 minutes at a pressure of 60 mm. Hg. The fruit was dried in a forced-air tunnel oven for 20 hours at 70° C., whereafter it contained 1630 p.p.m. of $SO_2$ and 16% of water.

EXAMPLE 10

2 kg. of fresh plums (of the Santa Rosa variety) were dipped into a 0.3%-by-weight aqueous solution of NaOH at 90° C. for 30 seconds, rinsed with fresh water and a 0.5% solution of citric acid, and immersed in an 8%-by-weight aqueous solution of sodium bisulfite in a vacuum vessel for 5 minutes at a pressure of 60 mm. Hg. The fruit was dried in a forced-air tunnel oven for 20 hours at 70° C., whereafter it contained 490 p.p.m. of $SO_2$ and 20% of water.

EXAMPLE 11

2 kg. of fresh pears (of the Koscha variety) were dipped into a 6%-by-weight aqueous solution of NaOH at 90° C. for 30 seconds, rinsed with fresh water and a 6% solution of citric acid, halved, pitted and immersed in a 4%-by-weight aqueous solution of $NaHSO_3$ in a vacuum vessel for 5 minutes at a pressure of 60 mm. Hg. The fruit was dried in a forced-air tunnel oven for 34 hours at 70° C., whereafter it contained 1720 p.p.m. of $SO_2$ and 15% of water.

EXAMPLE 12

1 kg. of fresh peaches (of the Red Haven variety) were dipped into a 2%-by-weight aqueous solution of NaOH at 90° C. for 30 seconds, rinsed with fresh water and a 3% solution of citric acid, pitted, halved and immersed in a 4%-by-weight aqueous solution of $H_2SO_3$ in a vacuum vessel for 5 minutes at a pressure of 60 mm. Hg. The fruit was dried in a forced-air tunnel oven for 12 hours at 70° C., whereafter it contained 380 p.p.m. of $SO_2$ and 11% of water.

EXAMPLE 13

The same procedure was followed as in Example 12, but the rinsing in a 3% solution of citric acid was omitted. The dried product contained 410 p.p.m. of $SO_2$ and 11% of water.

The examples, performed under comparable conditions, show that the final $SO_2$ content of the dehydrated fruit is the higher, the more concentrated the sulfuring solution and the longer the time of immersion in the latter.

We claim:
1. A method for the manufacture of dehydrated fruit which comprises in combination the steps of:
 (a) fissuring the skin by treating the fruit with a dilute alkaline aqueous liquid;
 (b) neutralizing the fruit with a dilute aqueous edible acid;
 (c) impregnating the fruit in vacuo with an aqueous sulfuring solution in an amount sufficient to preserve the fruit; and
 (d) forced-draft drying the fruit.
2. The method of claim 1 being applied to fruit of the genus Prunus.
3. The method of claim 2 being applied to apricots.
4. The method of claim 2 being applied to peaches.
5. The method of claim 2 being applied to plums.
6. The method of claim 2, wherein the fruit is halved after the neutralizing step and prior to the impregnating step.
7. The method of claim 6, wherein the fruit is pitted after being halved and prior to the impregnating step.

8. The method of claim 1 being applied to grapes.

9. The method of claim 1 being applied to pears.

10. The method of claim 1, wherein the step of fissuring the skin is effected by treating the fruit with an aqueous alkali metal hydroxide solution.

11. The method of claim 10, wherein the step of fissuring the skin is effected by treating the fruit with an aqueous alkali metal hydroxide solution at elevated temperature not to exceed approximately 90° C.

12. The method of claim 1, wherein the fruit is rinsed with water after the alkaline treatment of step (a).

13. The method of claim 1, wherein the neutralization is effected with citric, tartaric, acetic or phosphoric acid.

14. The method of claim 1, wherein the sulfuring impregnation is effected with an aqueous solution of $SO_2$ or of a water-soluble bisulfite or metabisulfite.

References Cited

UNITED STATES PATENTS

| | | | |
|---|---|---|---|
| 2,415,995 | 2/1947 | Derby | 99—204 |
| 3,365,309 | 1/1968 | Pader et al. | 99—204 |
| 2,848,333 | 8/1958 | Fisher | 99—102 |
| 2,723,202 | 11/1955 | Rivoche | 99—204 |
| 2,979,412 | 4/1961 | Lazar et al. | 99—204 |

S. LEON BASHORE, Primary Examiner

A. L. CORBIN, Assistant Examiner

U.S. Cl. X.R.

99—154